(12) United States Patent
Inoue

(10) Patent No.: US 6,764,078 B2
(45) Date of Patent: Jul. 20, 2004

(54) BRUSH SEAL DEVICE

(75) Inventor: Hideyuki Inoue, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/173,260

(22) Filed: Jun. 18, 2002

(65) Prior Publication Data
US 2003/0042682 A1 Mar. 6, 2003

(30) Foreign Application Priority Data

Aug. 29, 2001 (JP) ......................................... 2001-260129

(51) Int. Cl.⁷ .............................................. F16J 15/44
(52) U.S. Cl. ....................................................... 277/355
(58) Field of Search .......................................... 277/355

(56) References Cited

U.S. PATENT DOCUMENTS

| 1,045,088 A | * | 11/1912 | Wriedt | 277/529 |
|---|---|---|---|---|
| 1,809,056 A | * | 6/1931 | Mellor | 277/547 |
| 1,967,573 A | * | 7/1934 | Fox | 277/544 |
| 3,124,502 A | * | 3/1964 | Radke | 428/66.4 |
| 5,031,922 A | * | 7/1991 | Heydrich | 277/355 |
| 5,042,823 A | * | 8/1991 | Mackay et al. | 277/355 |
| 5,071,138 A | * | 12/1991 | Mackay et al. | 277/303 |
| 5,108,116 A | * | 4/1992 | Johnson et al. | 277/355 |
| 5,176,389 A | * | 1/1993 | Noone et al. | 277/355 |
| 6,431,550 B1 | * | 8/2002 | Tong | 277/346 |

FOREIGN PATENT DOCUMENTS

JP        2002081552 A  *  3/2002   ............ F16J/15/22

* cited by examiner

Primary Examiner—Alison Pickard
Assistant Examiner—Vishal Patel
(74) Attorney, Agent, or Firm—Arent Fox PLLC

(57) ABSTRACT

A brush seal unit can be formed in any size by coupling split brush-seal pieces, and the brush seal units can be easily stacked. In order to obtain such device, the brush seal unit of a brush seal device comprises split brush-seal pieces divided into a plurality of pieces, and each of the split brush-seal pieces has a projection on one split face at its base section and a recess on the other split face at its base section. The projection and the recess engage the corresponding recess and projection, respectively.

13 Claims, 16 Drawing Sheets

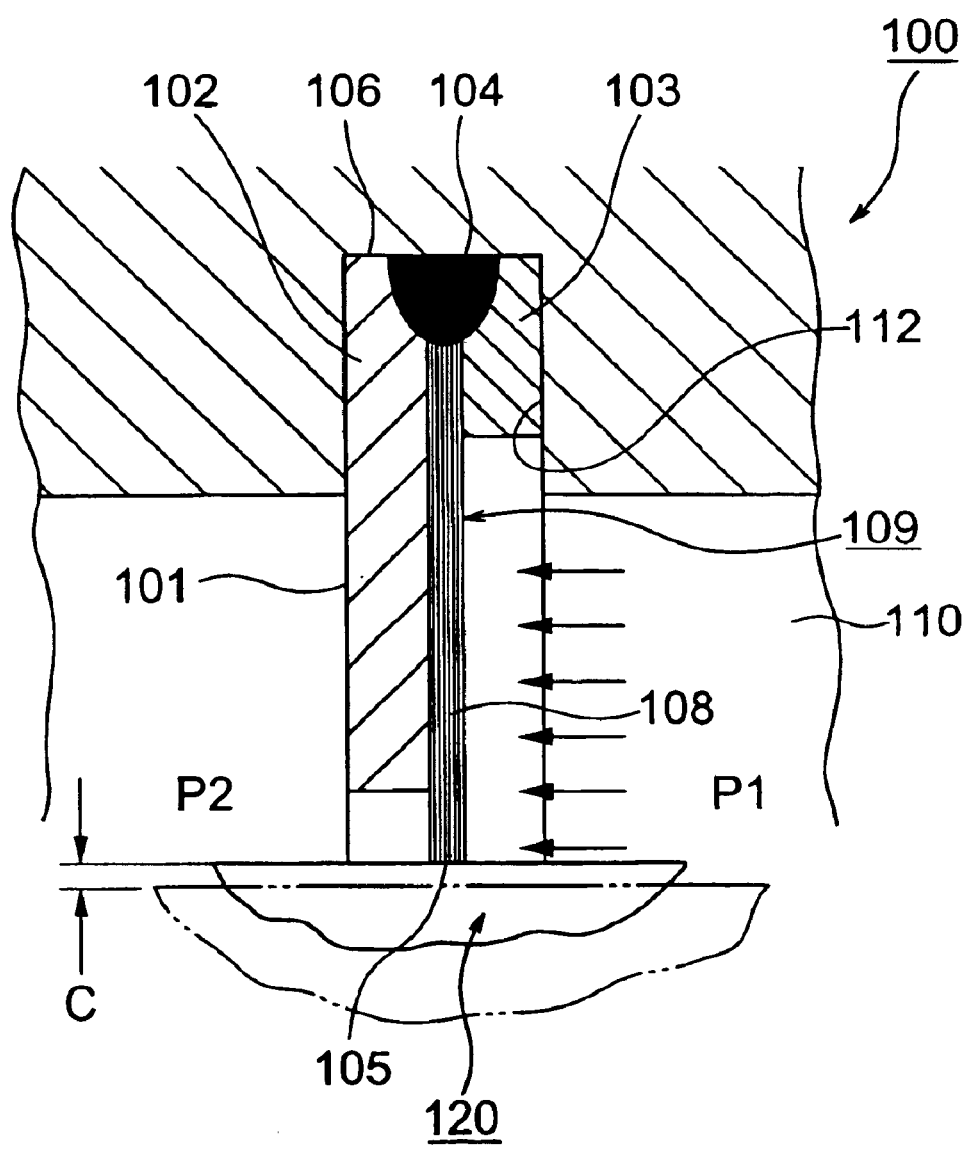

BRUSH SEAL DEVICE

BACKGROUND OF THE INVENTION

1. Field of the Invention

The present invention relates to a brush seal device for sealing a clearance formed between a shaft and its mating component that are relatively displaceable. More particularly, the present invention relates to a brush seal device for sealing a clearance formed between two components relatively displaceable, wherein a split brush-seal piece of a thin plate has a brush section on its one side and a base section on the other side and is formed with a projection on its one split face and a recess on its other split face, both the projection and recess being able to engage the corresponding recess and projection on the mating brush-seal pieces, respectively, and a plurality of split brush-seal pieces are connected in order to obtain a brush seal in any size.

2. Description of Related Art

As one related art to the present invention there exists a brush seal device 100, as shown in FIG. 14.

FIG. 14 is a sectional view of a brush seal device 100 mounted between a rotary shaft 120 and a casing 110 through which the rotary shaft 120 passes. The rotary shaft 120 and the casing 110 are components, such as of a steam turbine or gas turbine. The brush seal device 100 seals fluid by separating the space formed between the casing 110 and the rotary shaft 120 that displace relatively.

In FIG. 14, the brush seal device 100 is formed in a ring shape and secured in a channel section 112 of the casing 110. The brush seal device 100 has a brush seal 109 to which a backing plate 102 and support plate 103 are attached as its accessories. In the brush seal 109, bristles 101 are arranged in a circle to form a wall and coupled together at one end to form an attachment section 104. The free end 105 of the brush seal 109 faces the rotary shaft 120. The diameter of the bristle 101 used is generally 0.02 to 0.5 mm. Tens or hundreds of thousands of bristles are used for this purpose.

On one side of the brush seal 109 is located an annular backing plate 102 with its side face 108 in contact with the brush seal 109 and supports the bristles 101 against the action of the pressure of the sealed fluid.

Also, on the other side surface of the brush seal 109 is integrally placed a support plate 103 in the shape of a ring so as to, in cooperation with the backing plate 102, sandwich the brush seal 109 at its attachment section 104 side. The length of the support plate 103 in radial direction is made small so as to allow the brush seal 109 to be exposed to deform. One ends of the backing plate 102, attachment section 104 of the brush seal 109, and support plate 103 are welded together to form a coupling section 106.

FIGS. 15A and B are front views of part of the brush seal 109 shown in FIG. 14. The brush seal device 100 in FIG. 15A is in a state that the brush seal 109 and the rotary shaft 120 are normally fit each other such that there occurs no relative oscillation therebetween and the bristles 101 are straightly inclined in the rotational direction with respect to the radial direction of the rotary shaft 120. The normal state of the brush seal 109 is that the rotary shaft 120 contacts or approximates to the free end 105, as shown by the solid line in FIG. 14.

In the brush seal 109 formed in such a way described above, the larger the diameter of the brush seal 109 is, the more difficult the production thereof, due to the increase of the number of the bristles 101 to hundreds of thousands.

Specifically, fixing the bristles 101 between the backing plate 102 and the support plate 103 while slanting the bristle 101, further increases its manufacturing cost.

Additionally, because the brush seal 109, backing plate 102, and support plate 103 are welded together into one piece, the backing plate 102 and the support plate 103 must have a larger thickness for strengthening them in a larger brush seal device 1. Thus, not only the yield of material is reduced by the increase of the number of the bristles, but also yield of material involved in the number of the backing plates 102 or the support plates 103 that can be cut out from one steel plate is reduced.

A brush seal device shown in FIG. 16 is another related art to the present invention. The brush seal device in FIG. 16, has a number of thin plates as a brush seal 209, that are piled in the circumferential direction of the rotary shaft 120 and seals a high pressure area P1 and a low pressure area P2. Outer peripheral of the brush seal 209 is brazed to form an attachment section 104 and then mounted in a channel section of a casing 110 through the brazed attachment section 104. Also, a backing plate 102 is located on the side surface of the brush seal 209 that faces the low pressure area P2, a support plate 103 is located on the opposed side surface that faces the high pressure area P1, and thus both the plates 102 and 103 support the both side surfaces of the brush seal 209, respectively.

However, when the rotary shaft 120 eccentrically presses against the brush seal 209 that are formed in the way above, the brush seal 209 of piled thin plates forming an annular body is not given a space ample to deform itself, and the spring constant corresponding to the elastic deformation is therefore increased, which causes a problem such that it is difficult to follow the eccentric movement of the rotary shaft 60. To overcome this drawback, the clearance between the seal 209 and the outer circumference surface of the rotor 120 has been selected larger, but a problem concerning to the capability to prevent the leakage of fluid to be sealed is also present.

Additionally, the pressure of the sealed fluid acts on the seal 209 in the direction of the surfaces of the piled thin plates forming the seal 209 and, as the result, gaps are forcedly increased between the piled plates. Accordingly, also in this case, a problem concerning to the capability to prevent the leakage of fluid to be sealed is present.

Moreover, the brush seal 209 forming an annular body includes some hundreds of thousands thin plates used. Therefore, it is extremely difficult to fabricate the brush seal 209 and the yield of material is also poor. Further, as the length along the outer circumference of the annular body of the brush seal 209 is longer than that along the inner circumference, spacers are necessarily disposed on the outer circumference to compensate the difference in the circumferential length between the outer and inner circumferences. However, gaps still remain between the surfaces of the piled plates. In this viewpoint, there also exists the problem of sealing ability. Also, as a whole, the brush seal 209 constitutes a ring, thereby to cause its elasticity to be lost, so that the flexibility thereof may be reduced and the free end 105 of the brush seal 209 be worn quickly.

In the brush seal device 100 constituted as described above, when the rotary shaft 120 contacts the brush seal 109 involved in any vibration, oscillation or the like, the brush seal 109 is pressed to contact the rotary shaft 120, and at he same time its tilt angle is increased, as shown in FIG. 15B.

Referring to FIG. 14, the clearance C generated between the free end 105 of the bristles 101, at the position diametrically opposite to the position where the rotary shaft 120 presses against the brush seal 101 (in the state shown in FIG. 15B) becomes larger due to the oscillation of the rotary shaft 120, as shown by phantom line in FIG. 14, which will cause leakage of the sealed fluid though the clearance C. In order to prevent this leakage, the bristles 101 are slanted toward the rotational direction of the rotary shaft. However, because hundreds of thousands of bristles 101 are arranged to form a wall in a bundle as a seal device, the yield of material may become poor, and it may be extremely difficult to fabricate an attachment structure for slanting bristles 101.

Further, the bristles 101 of steel wire are forcedly separated to each other by the pressure of the sealed fluid, which also present a problem of its sealing ability.

Also, in the seal 209 in FIG. 16, because the thin plates are coupled along the direction of action of sealed fluid, the sealed fluid will pass or leak through gaps between the surfaces of neighboring plates. In addition, the flexibility of the free end 105 of the seal 209 must be reduced, clearance between the rotary shaft 120 and itself must be larger, and the problem of sealing ability also occurs. Also, the thin plates forming the seal 209 are layered one by one along the circumference of the rotary shaft 120, resulting in a large number of thin plates being required and yield of material being reduced. Further, the increase of material will adversely reduce the flexibility and the wear on the seal 209 is therefore accelerated by the friction generated at the tip of the seal 209.

The present invention has been made in consideration of the problems as described above, and therefore the technical problem is to enable the production of a brush seal having smaller parts of material regardless of its size, so that yield of material can be improved. Also, it is an object of the present invention to achieve to manufacture brush seals easier, so that production equipment cost can be reduced. Also, it is another object of the present invention to easily form the attachment section and also easily mount the brush seal device to machinery and equipment without disassembling them. Also, it is still another object of the present invention to provide a brush seal easily replaceable when it is damaged.

In addition, it is yet another object of the present invention to increase the sealing ability of the brush seal.

SUMMARY OF THE INVENTION

The present invention has been made to solve the problems as described above, and technical means for solving the problems are constituted as described hereinafter.

The brush seal device of a preferred embodiment according to the present invention is one mounted on one of two components that are relatively rotated, for sealing the clearance given between the two components, comprising:

a brush seal having brush seal units made of thin plate, each brush seal unit having a brush section with slits on a side of the thin plate that faces the other component and having a base section on the opposing side that is fixed on the one component, wherein the brush seal unit of the brush seal has a plurality of split brush-seal pieces, and each of the split brush-seal piece has on its split surfaces engagement portions, one having a projection and the other having a recess, which are capable of engaging a corresponding recess and a projection of mating split brush-seal pieces, respectively.

According to the brush seal device of a preferred embodiment of the present invention, the brush seal is divided into a number of split brush-seal pieces and each of the split brush-seal pieces has a projection and a recess in its both split surfaces, so that it is easy to position and assembly and the binding forces at the engagement section are strong. Furthermore, the split brush-seal piece is small even if a brush seal device is larger, and therefore a number of split brush-seal pieces can be obtained from a thin plate, resulting in the improvement of the yield of material.

Further, because the attachment section of the brush seal is formed in the base section of a thin plate, the assembly work for stacking is facilitated in assembling the brush seal device. Moreover, the bristles on one side of a thin plate are formed in the shape of strips, so that the bristles integral with the attachment section is easily attached, and the plate-like bristles have effective ability to seal. Additionally, a number of split brush-seal pieces can be produced from a thin steel plate by etching process or the like, so that machining or processing is easy to perform, and equipment cost can be reduced.

The present disclosure relates to subject matter contained in Japanese Patent Application No. 2001-260129, filed on Aug. 29, 2001, the disclosure of which is expressly incorporated herein by reference in entirety.

BRIEF DESCRIPTION OF THE DRAWINGS

FIG. 14 is a sectional view, showing a brush seal device of a related art;

DETAILED DESCRIPTION OF THE INVENTION

Some embodiments of the brush seal device according to the present invention will be described in detail hereinafter with reference to the accompanying drawings. The drawings are not conceptual but design drawings.

Figure 1:
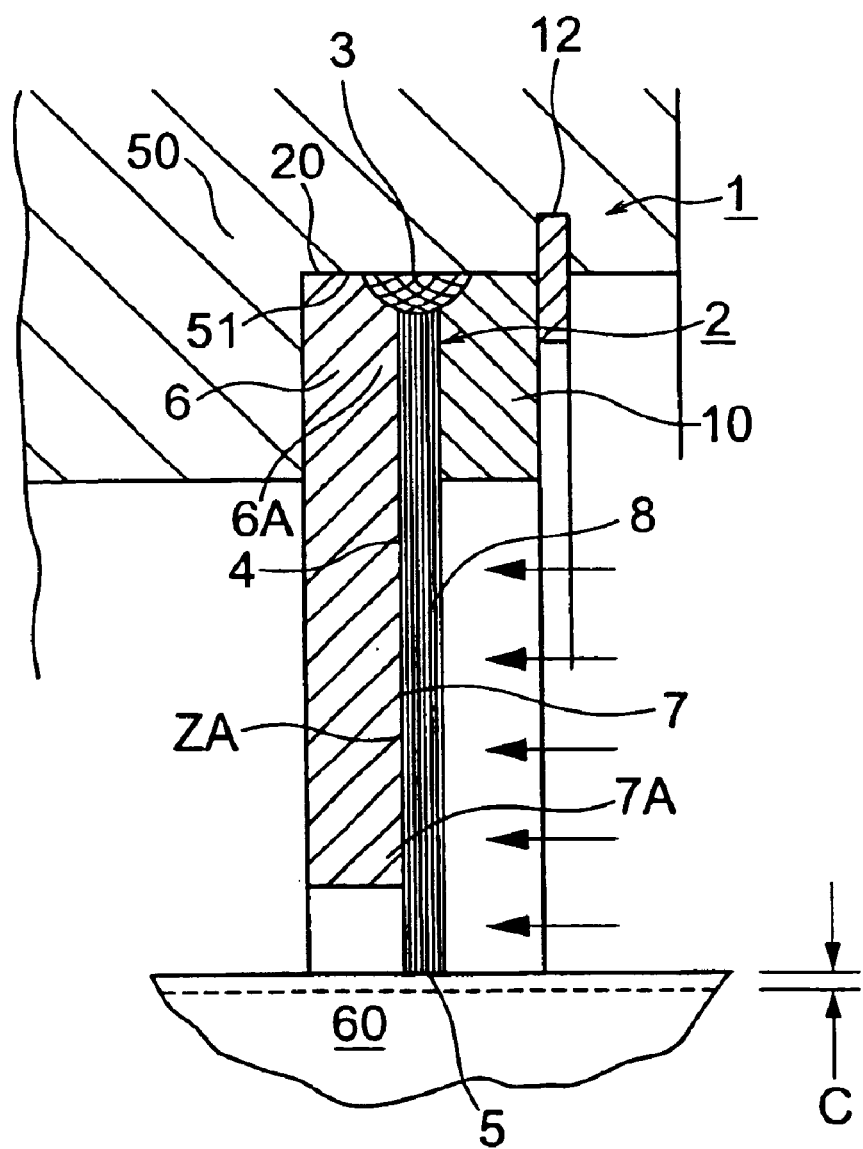
FIG. 1 is a sectional view, showing in half the first embodiment of a brush seal device according to the present invention.

FIG. 1 is a sectional view, showing in half the first preferred embodiment of the invention, in which a brush seal device 1 used in a gas turbine device separates the clearance between the bore of a casing 50 and a rotor 60 inserted therein to divide into a high pressure area P1 and a low pressure area P2.

In FIG. 1, the reference numeral 1 denotes a brush seal device. A fixing section 20 on the outer circumference side of the brush seal device 1 is mounted, through a snap ring 12, on a step 51 in the inner circumference of the casing 50 which is the other component of the two components. The fixing section 20 may be mounted to a channel section 51 defined by in an assembled structure. The free end portion 5 at the inner circumference side of the brush seal device 1 is arranged to face the outer circumference of the rotor 60 as the other component, in contact therewith or close thereto. Thus, the fluid in the high pressure area P1 is sealed by the brush seal device 1.

In the brush seal device 1, a brush seal 2 is the main component and a backing plate 6 and a support section 10 are accessories.

Among those components, the brush seal 2 is constituted with a plurality of brush seal units (brush seal unit plate) 2P piled or stacked to form a wall. The brush seal unit at its inner side is formed with strips that are slanted toward the rotational direction of the rotor 60, shown as a brush section 2A. The base section 2B at its outer side defines an attachment section 3.

The brush section 2A is formed into brushes 8 constituted with a number of strips formed such that an annular thin plate has thin strips at its inner side and each strip has a square or rectangular shape in cross section. Also, outer circumference end portions of the strips are welded or press-welded together to form an attachment section 3.

Figure 2:
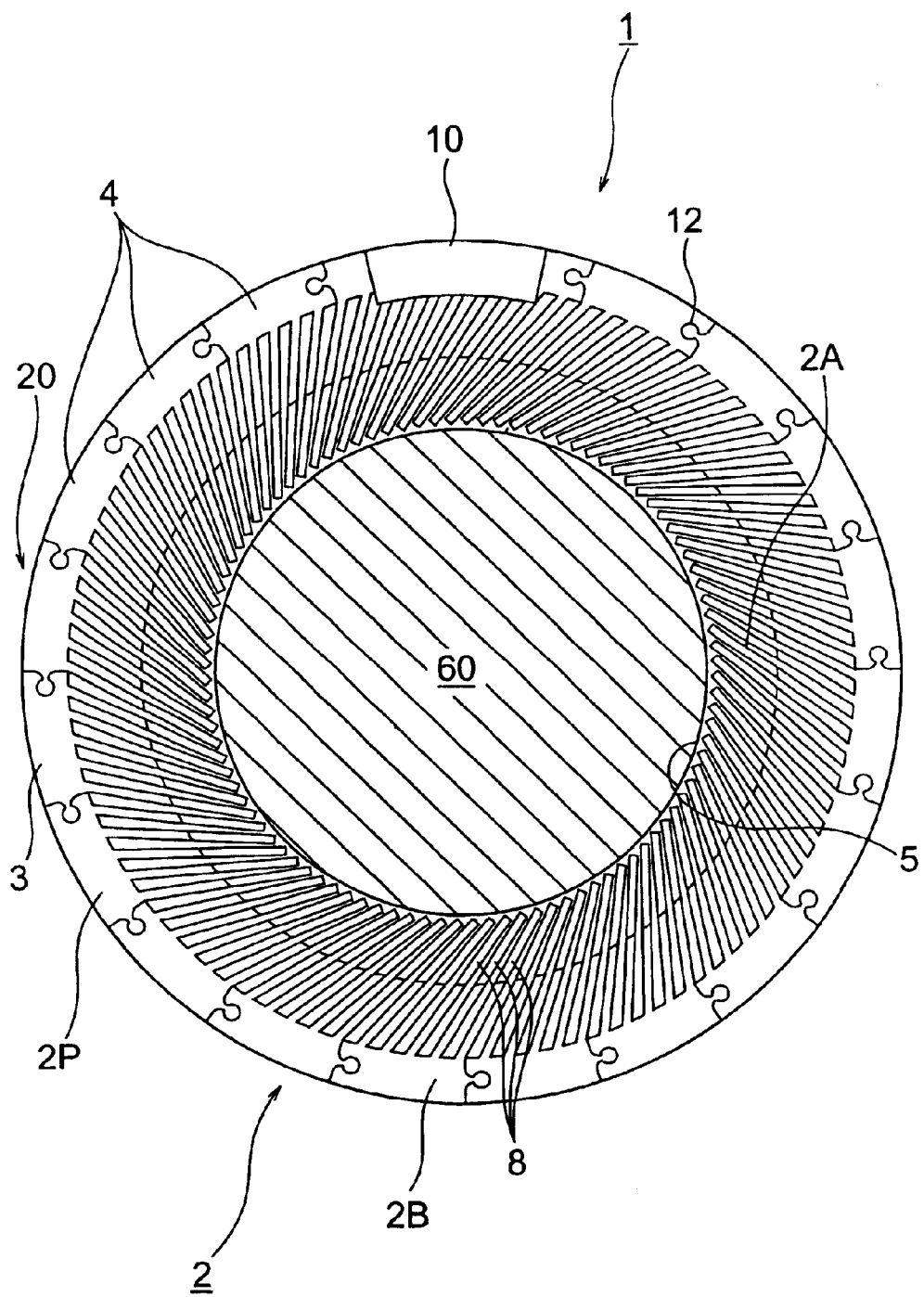
FIG. 2 is a front view of FIG. 1, as seen from the axial direction.
Figure 3:
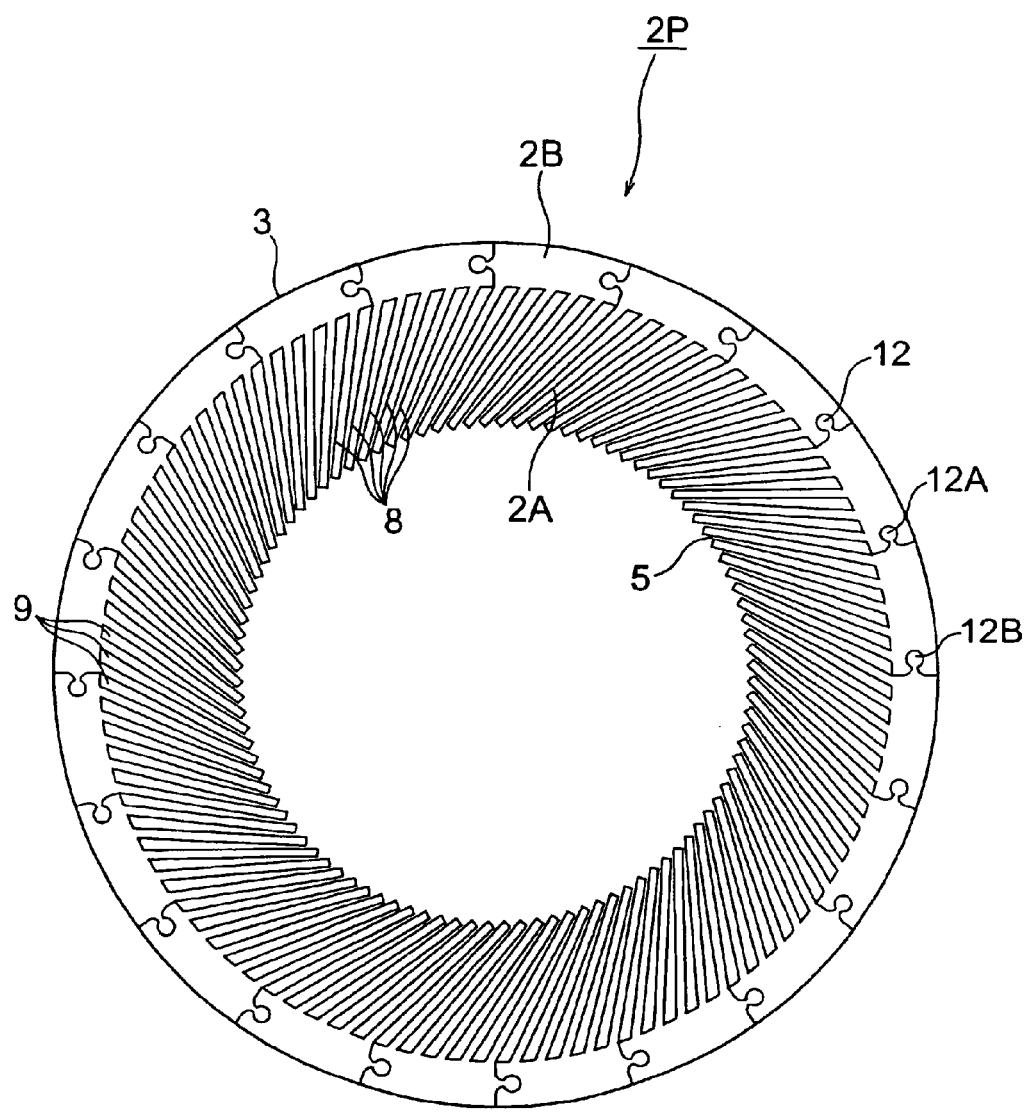
FIG. 3 is a plan view, showing a brush seal unit according to the first embodiment of the present invention in FIG. 1.

FIG. 2 shows a plan view of a brush seal device 1 in FIG. 1. The brush seal 2 is composed of a plurality of stacked and integrated brush seal units 2P in the first embodiment, as shown in FIG. 3. The brush seal unit 2P is formed as an annular plate made from a thin plate, as shown in FIG. 3. The brush seal unit 2P at its inner circumference side is formed into a number of brushes 8 as strip like bristles to define a brush section 2A. Also, the brush seal unit 2P at its outer circumference side is formed as a base section 2B on the thin plate.

Figure 4:
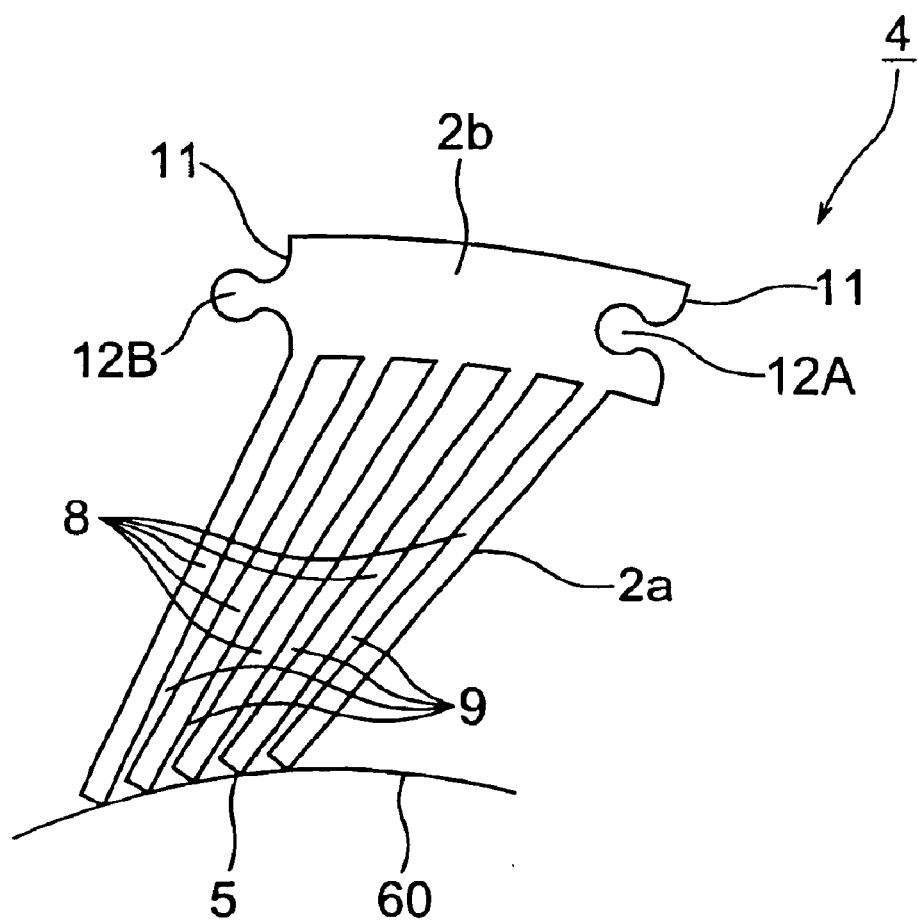
FIG. 4 is a plan view, showing the first embodiment of a split brush-seal piece in a brush seal unit in FIG. 3.

The brush seal unit plate 2P is equally divided around its circumference direction. The divided split brush-seal piece (also referred to as a module plate) 4 is in the shape as shown in FIG. 4 which is a plan view of the split brush-seal piece 4. A circular recess 12A is formed on a divided face 11 of base section 2B constituting the attachment section 3 of the split brush-seal piece 4. A projection 12B having a projecting circular shape is formed on the other divided face 11 of the base section 2B. The recess 12A and the projection 12B are formed such that they fit each other, and the combined projection and recess form an engagement portion 12.

A brush section 2A formed into strips is formed at the inner (inner diameter) side of base section 2B of the split brush-seal piece 4. The brush section 2A is slanted toward the rotational direction of a rotor 60. The brush section 2A is composed of a number of brushes 8 as bristles having a cross section of a rectangular or quadangle. The split brush-seal piece 4 can be easily formed by fine processes, such as etching, wire electric discharging and pressing.

In one embodiment of the split brush-seal piece 4, slits 9 forming triangular spaces are provided on its inner circumference side of an arced thin plate. Brushes 8 formed with the slits 9 are formed as plate-like bristles having rectangular (rectangle or square) cross section, and the dimensions of the cross section in each brush 8 is (0.5–0.005)×(0.5–0.005) mm, preferably (0.20–0.008)×(0.2–0.018) mm. The length is 5–50 mm. The thickness of the thin plate is 0.5–0.003 mm. The thickness of the wall in which the brush seals are stacked 0.5–5 mm or 0.01–0.5 mm, depending on the pressure of the sealed fluid. The wall herein means a partition formed by stacking the brush seals 2 in the direction of the action of sealed fluid.

Materials of the brush seal 2 includes, for example, steel, stainless steel, nickel-base alloy and ceramic.

Split brush-seal pieces 4 in FIGS. 5 to 11 show the second through eighth embodiments according to the present invention.

Figure 5:
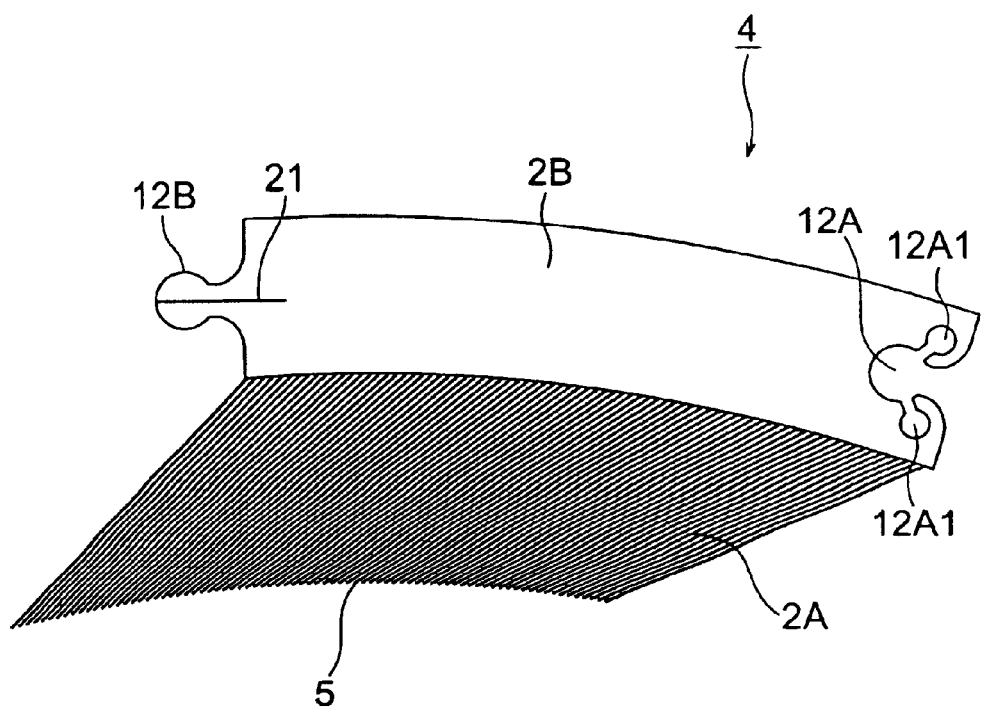
FIG. 5 is a plan view, showing the second embodiment of a split brush-seal piece.

FIG. 5 is a plan view of the second embodiment of the split brush-seal piece 4 according to the invention. The entire structure of the split brush-seal piece 4 is almost the same as that having a shape as shown in FIG. 4. A specific different point is a structure of an engagement portion 12. The shape of a recess 12A of the engagement portion 12 is that of a recess 12A of FIG. 4 with a notch 12A1, allowing to have elasticity. Also, the shape of a projection 12B in the engagement portion 12 is same to that of a projection 12B with a slit 21 in FIG. 4. The slit 21 allows the projection 12B to have elasticity. By forming an engagement portion 21 so as to have elasticity, binding force of the engagement portion 21 is strengthened.

Figure 6:
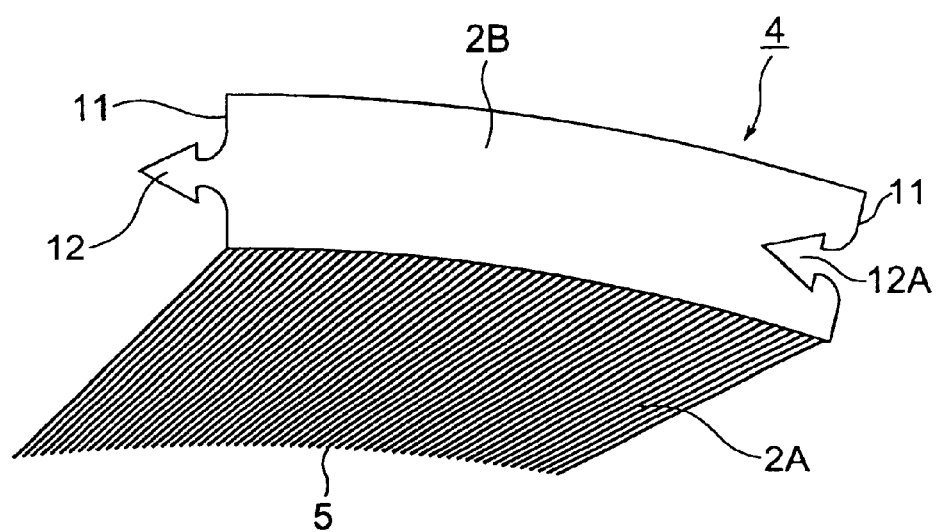
FIG. 6 is a plan view, showing the third embodiment of a split brush-seal piece.

FIG. 6 is a plan view of the third embodiment of a split brush-seal piece 4. In the split brush-seal piece 4 in FIG. 6, the shape of the projection 12B and its mating recess 12A that constitute the engagement portion 12 is in the shape of an arrow. Also, the projection 12B of the engagement portion 12 is formed to project in the shape of an arrow such that it can engage with the recess 12A. The engagement portion 12 functions to prevent the split brush-seal pieces 4 mated each other from coming off. It is adopted in a small brush seal device 1.

Figure 7:
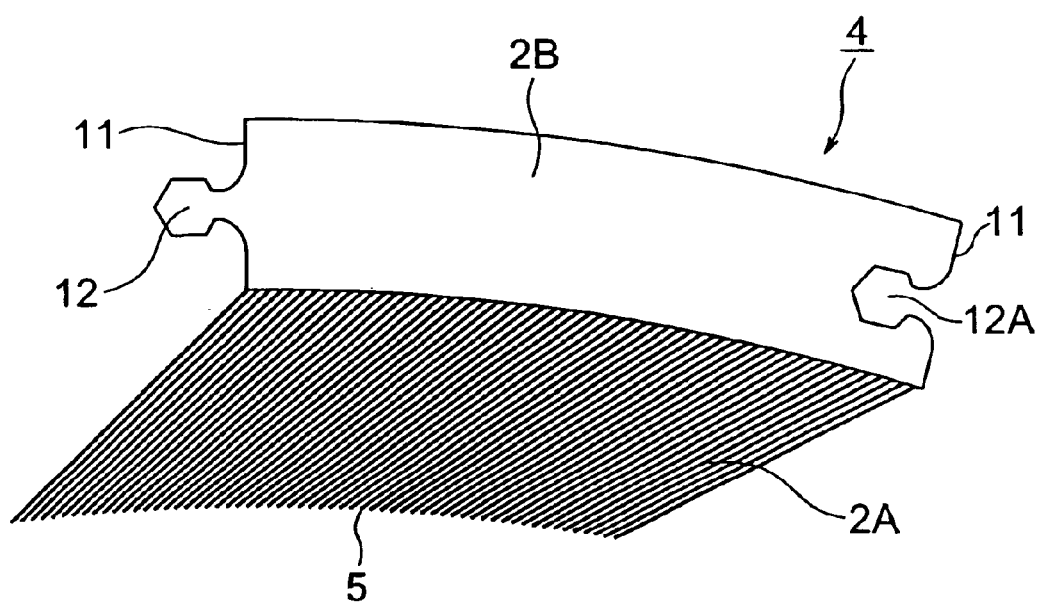
FIG. 7 is a plan view, showing the fourth embodiment of a split brush-seal piece.

FIG. 7 is a plan view of the fourth embodiment of the split brush-seal piece 4. In the split brush-seal piece 4 in FIG. 7, the shape of the recess 12A of the engagement portion 12 is a hexagon. Also, the shape of the projection 12B of the engagement portion 12 is a projecting hexagon such that it can engage with the recess 12A. The engagement portion 12 is connected such that the connected split brush-seal pieces 4 do not oscillate each other.

Figure 8:
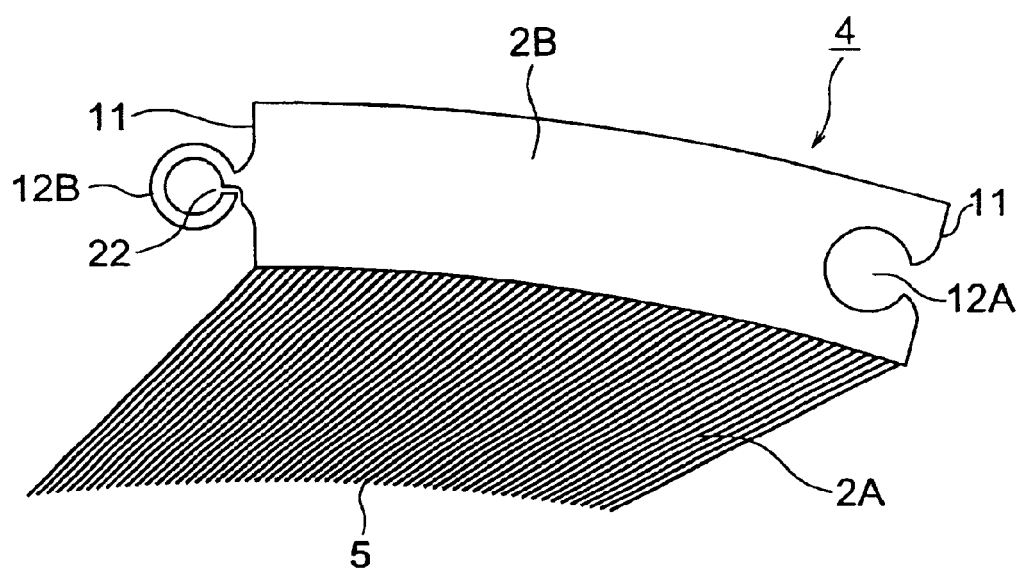
FIG. 8 is a plan view, showing the fifth embodiment of a split brush-seal piece.

FIG. 8 is a plan view of the fifth embodiment of a split brush-seal piece 4. The split brush-seal piece 4 in FIG. 8 is the one in which the recess 12A of the engagement portion 12 is formed as a recessed circle. Also, the projection 12B of the engagement portion 12 is formed in C-shape provided with a slit portion 22 at the base where the recess 12A is engaged. The engagement portion 12 is connected such that the split brush-seal pieces 4 are firmly connected.

Figure 9:
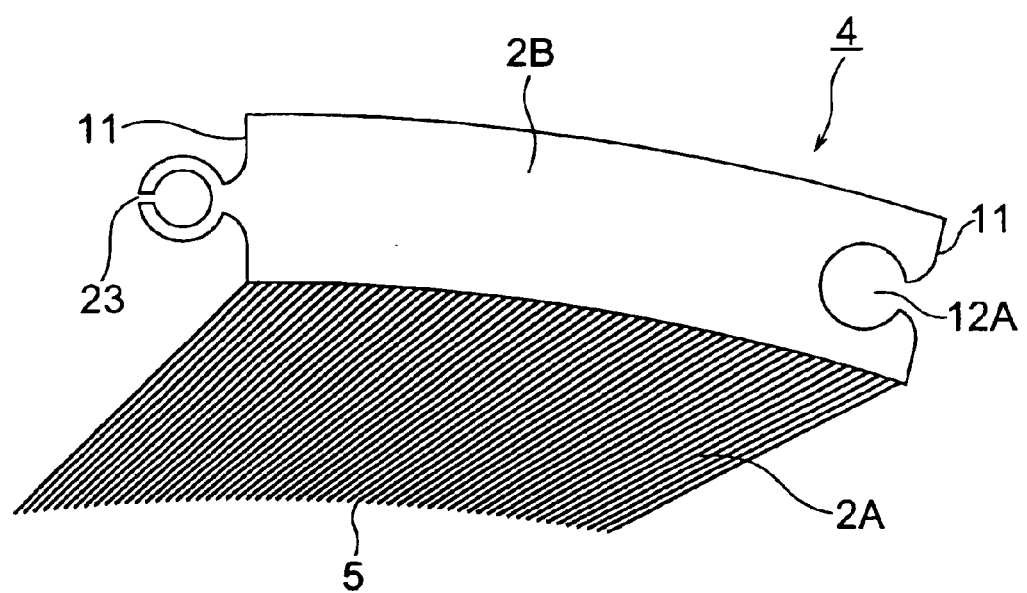
FIG. 9 is a plan view, showing the sixth embodiment of a split brush-seal piece.

FIG. 9 is a plan view of the sixth embodiment of a split brush-seal piece 4. The split brush-seal piece 4 in FIG. 9 is the almost the same as the split brush-seal piece 4 in FIG. 8. The difference is that a slit portion 23 forming a C-shaped projection 12B is not located at the root but at the tip.

The engagement portion 12 in this case functions similarly as in the case in FIG. 8.

Figure 10:
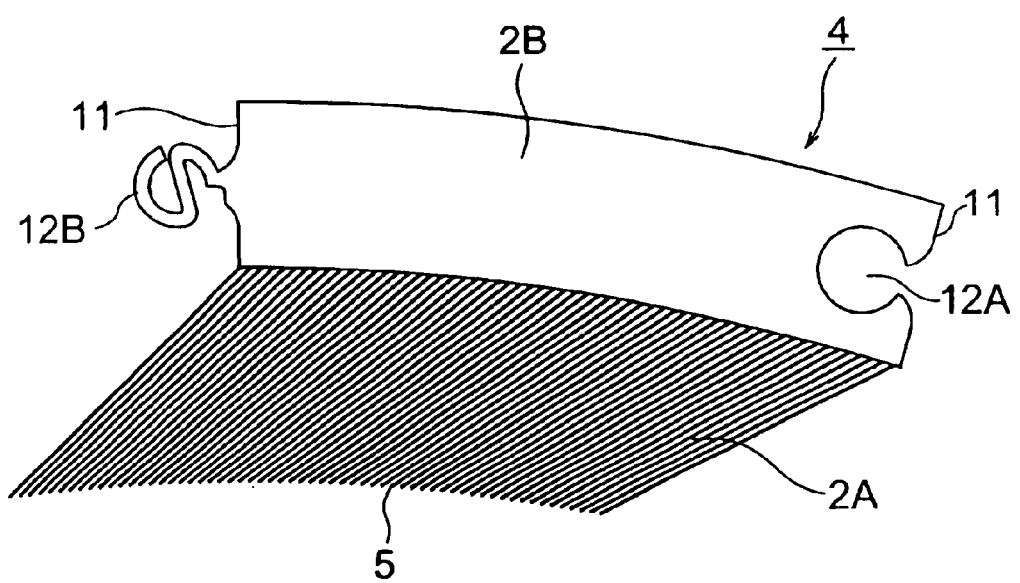
FIG. 10 is a plan view, showing the seventh embodiment of a split brush-seal piece.

FIG. 10 is a plan view of the seventh embodiment of a split brush-seal piece 4. The split brush-seal piece 4 in FIG. 10 is the one in which the recess 12A of the engagement portion 12 is formed in a circle. Also, the projection 12B of the engagement portion 12 is formed in S-shape so as to engage the recess 12A. The engagement portion 12 is connected such that the split brush-seal pieces 4 are firmly connected.

Figure 11:
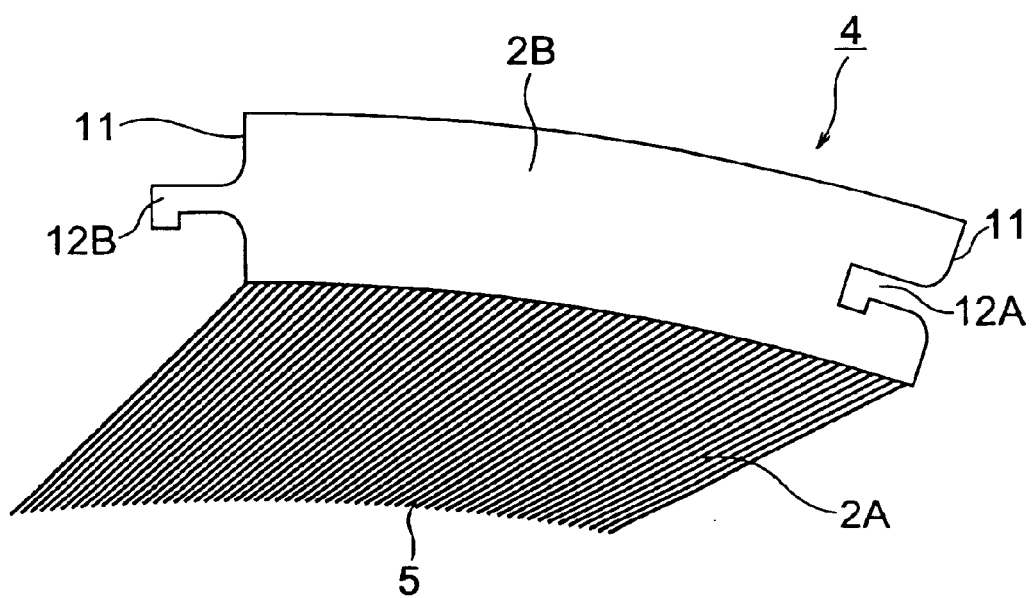
FIG. 11 is a plan view, showing the eighth embodiment of a split brush-seal piece.

FIG. 11 is a plan view of the eighth embodiment of a split brush-seal piece 4. The split brush-seal piece 4 in FIG. 11 is the one in which the recess 12A of the engagement portion 12 is formed in L-shape. Also, the projection 12B of the engagement portion 12 is formed in L-shape such that it engages the recess 12A. The engagement portion 12 is connected such that the connected split brush-seal pieces 4 do not come off.

By coupling the engagement portions 12 of the split brush-seal pieces 4, a brush seal unit 2P can be assembled. The brush seal units 2P are stacked to form a brush seal 2. The brush seal 2 is sandwiched at the both sides of the attachment section 3 by a backing plate 6 and a support plate 10 to form a fixing section 20 of the brush seal device 1.

As shown in FIG. 1, the backing plate 6 has a fixing section 6A for supporting the attachment portion 3 of the brush seal 2 and a support surface 7 for supporting the brush seal 2 against the pressure of the sealed fluid such that the brush seal 2 is not extremely bent. The brush seal 2 and the support surface 7 may be in contact each other ass shown in FIG. 1, or may be separated each other.

The free end 5 of the brush seal 2 contacts the rotor 60 when the rotor oscillates to a great extent. However, the brush section 2a is composed of a number of fine plate-like brushes 8 having angular cross section, so that their spring constant is small, and it follows elastically in response to the oscillation of the rotor even if it contacts the rotor 60, thereby to prevent the brushes 8 from being worn. The brush seal 2 is allowed to deform resiliently, following to the displacement of the rotor 60 even if the brush seal 2 contacts the rotor 60. That is, the contact pressure is relaxed, depending on the spring constant preset for the brush seal 2 when the rotor 60 oscillates. In addition, when the rotor 60 oscillates to an extent slightly more, the plate-like brushes 8 of the brush section 8 further decreases the contact pressure, thereby to reduce wearing action In the brush seal 2, the attachment section 3, the backing plate 6 and the support plate section 10 are welded together with electron beam or the like. The three-piece welding area defines the fixing section 20. The support section 10 is formed into a ring shape with the length smaller than that of the backing plate 6 in radial direction. In FIG. 1, the length of the support section 10 is equal to that of the fixing section 20. The former length may be a length approximate to that of the backing plate 6 in radial direction. In this case, between the brush seal 2 and the side surface of the support section 10 is formed a space into which the sealed fluid flows.

It is preferred to select the material of the backing plate 6 and the support section 10, depending on the coefficient of linear thermal expansion of the casing 50. They are made of, for example, nickel base alloy, iron, steel, stainless, or other non-ferrous metal. Various kinds of materials are selected, depending on the type of sealed fluid, temperature or other conditions in application fields.

Figure 12:
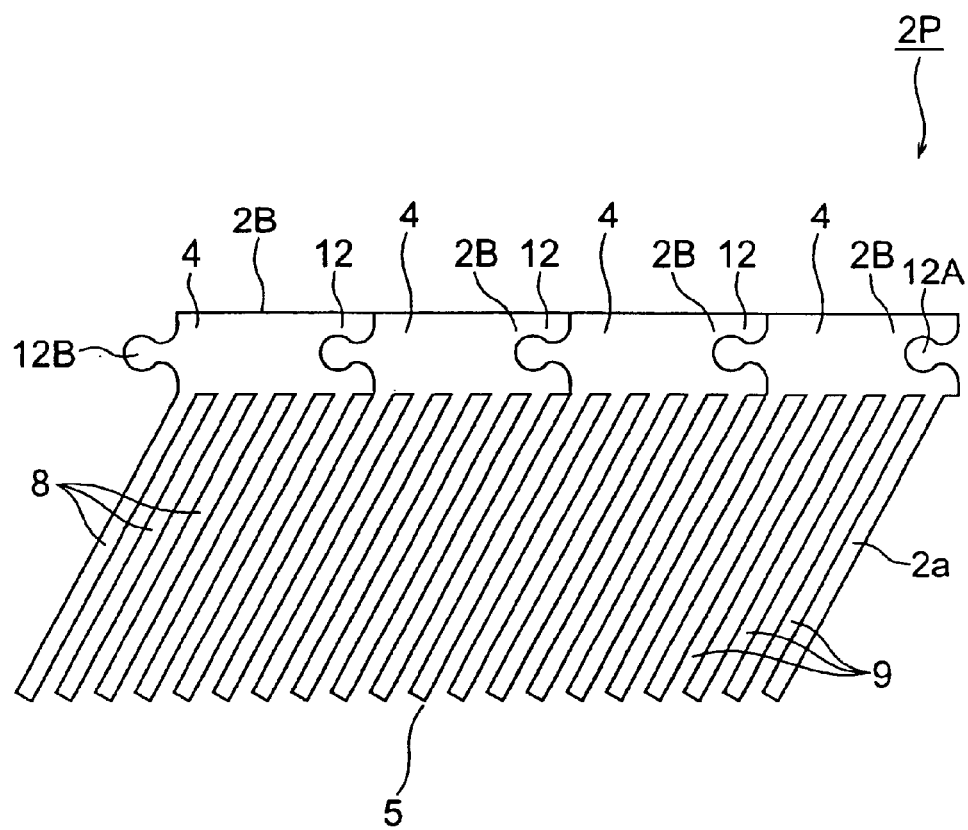
FIG. 12 is a plan view, showing the second embodiment of a brush seal unit according to the present invention.

FIG. 12 is a plan view of a brush seal unit 2P of a brush seal device 1 according to the second embodiment of the present invention.

The brush seal unit 2P is located within a straight space. The base section 2B of the brush seal unit 2P is made rectangular, and a recess 12A and a projection 12B are formed on both split surfaces 11, 11 of the base section 2B. By connecting the recesses 12A and the projections 12B to form engagement portions 12 in order, the brush seal unit 2P is completed. The brush section 2A of the brush seal unit 2P is slanted toward a row direction, but it is possible not to be slanted, that is, may be extend along the row direction. Other configurations are similar to that of the brush seal unit 2P in FIG. 3.

Figure 13:
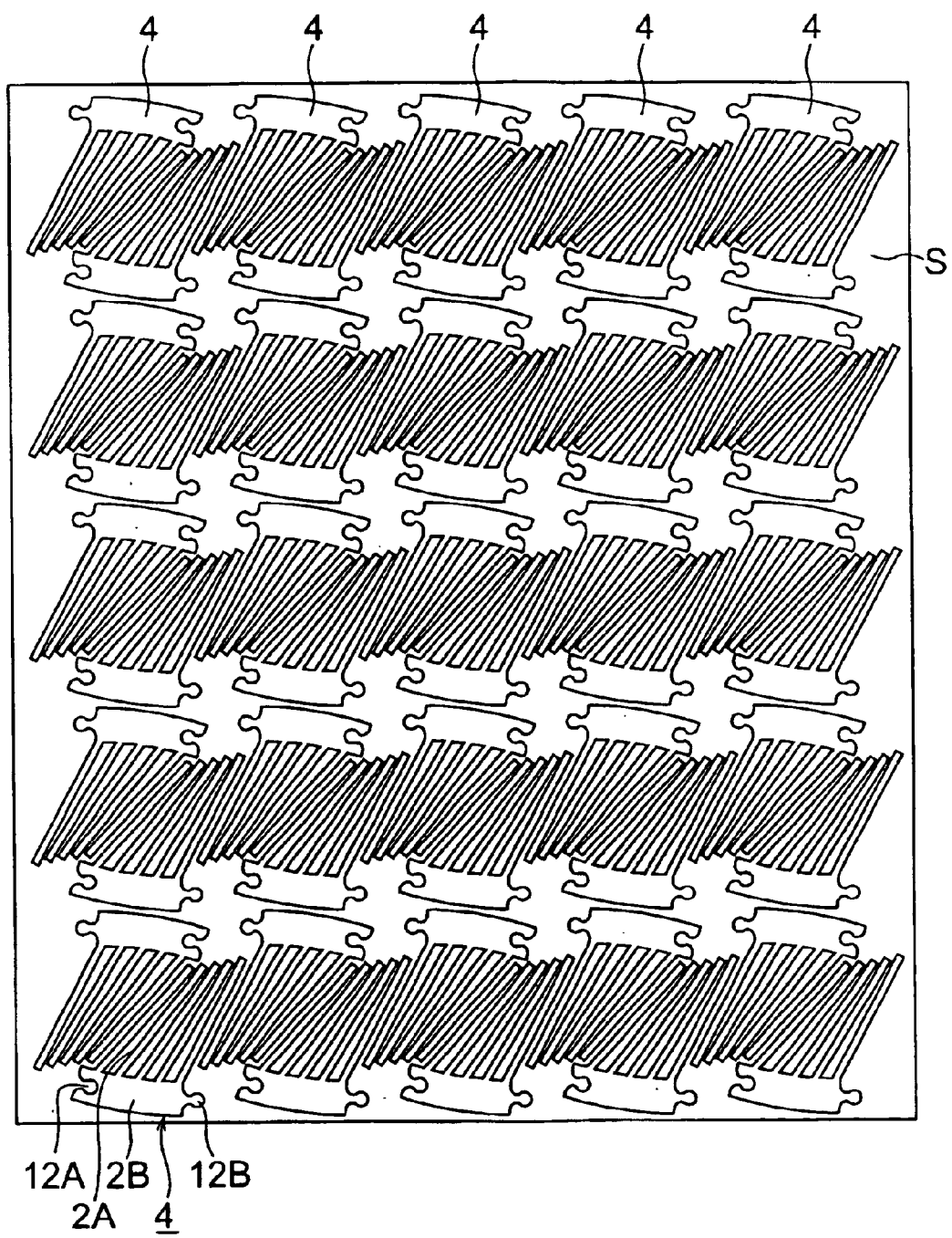
FIG. 13 is a plan view, showing a split brush-seal piece of FIG. 4, obtained from a thin plate to be machined.
Figure 15A:
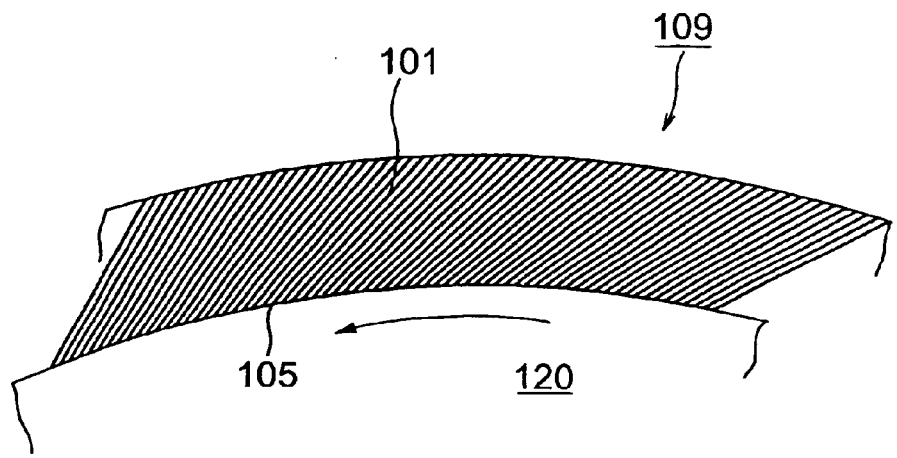
FIG. 15A is a plan view, showing a portion of a brush seal device of the related art.
Figure 15B:
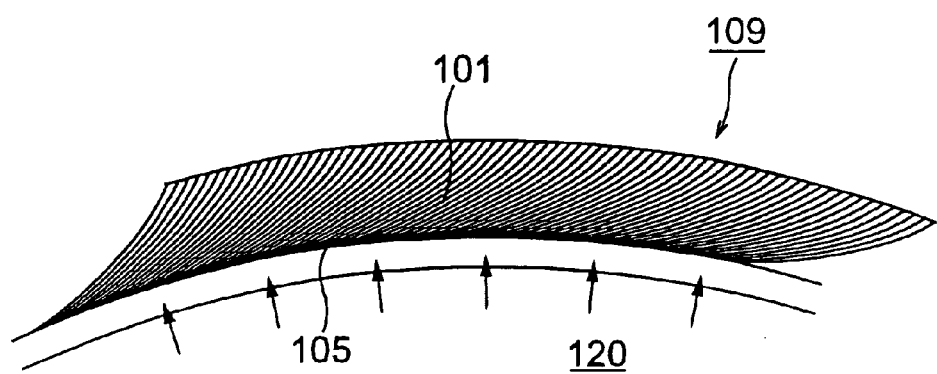
FIG. 15B is a plan view, showing a brush seal device in a state that a rotation shaft is in contact.
Figure 16:
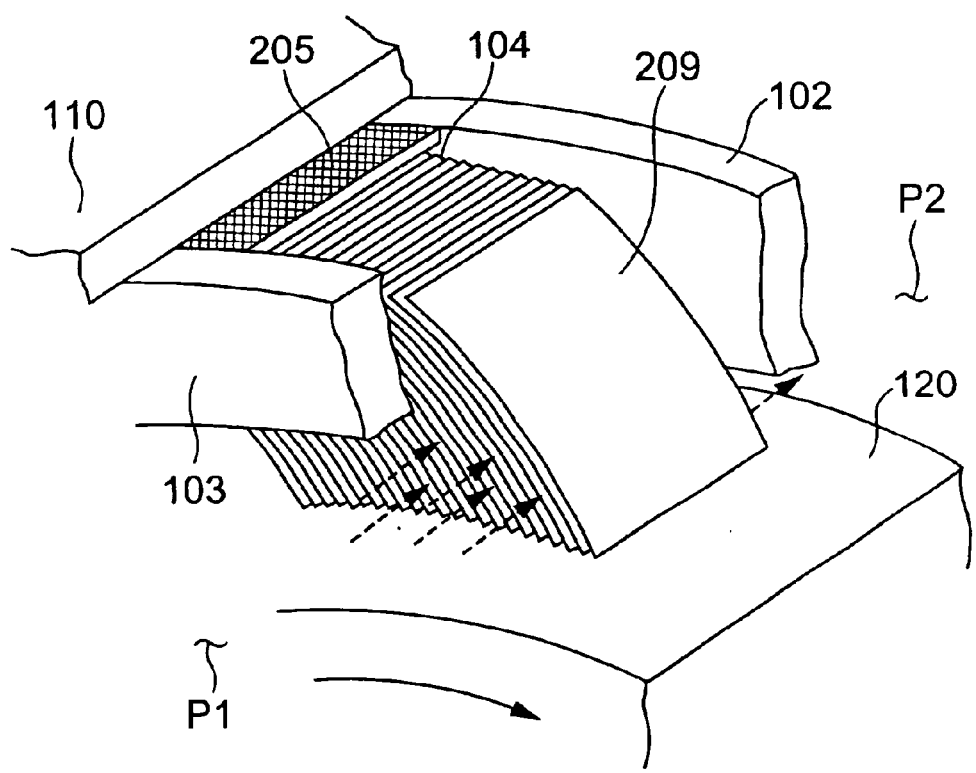
FIG. 16 is a perspective view, showing a brush seal device of another related art.

FIG. 13 is a plan view, showing to obtain a number of split brush-seal pieces 4 in FIG. 4, from a thin steel plate S. In Fig. 13, 25 split brush-seal pieces 4 can be obtained from a thin plate by etching process. Thus, the yield of material is increased by taking a number of pieces in this way. This is achieved by providing the engagement portion 12 on the split surfaces 11 of a split brush-seal piece 4.

Now, still another preferred embodiment according to the present invention will be described.

The second embodiment of a brush seal device 1 according to the present invention is a brush seal device 1 mounted on one of two components that are relatively rotated, for sealing the clearance given between the two components, comprising:

a brush seal 2 having brush seal units 2P made of thin plate, each brush seal unit 2P having a brush section 2A with slits on a side of the thin plate that faces the other component and having a base section 2B on the opposing side that is fixed on the one component;

a backing plate 6 for supporting an attachment section 3 of the brush seal 2;

a support section 10 for supporting the attachment section 10 between the backing plate 6 and the support section 10;

wherein the brush seal unit 2P of the brush seal 2 has a plurality of split brush-seal pieces 4, and each of the split brush-seal piece 4 has on its split surfaces 11, 11 engagement portions 12, 12, one having a projection and the other having a recess, which are capable of engaging a corresponding recess and a projection of mating split brush-seal pieces 4, respectively.

In the second embodiment of a brush seal device 1 according to the present invention, a brush seal 2 is divided into a number of split brush-seal pieces 4 and the engagement portions 12 having a projection and a recess are formed on both split faces 11, 11 of respective split brush-seal piece 4, so that positioning and assembly work are easy to perform, and the coupling force at the engagement portion 12 is increased. Furthermore, the split brush-seal pieces 4 can be designed to be smaller even if a brush seal device 1 is larger in size, so that a number of split brush-seal pieces 4 can be produced from one thin plate. As the result, the yield of material is improved.

Further still, because the attachment section 3 of the brush seals 2 is formed at the base section of thin plates, the work to stack them during the assembly operation of the brush seal device 1 is easy. In addition, brushes are formed of a thin plate on its one side into, so that each brush section 8 integral with the attachment section 3 is easy to attach, and each brush section 8 has improved sealing ability.

Moreover, the use of etching process facilitates to manufacture a number of split brush-seal pieces 4 from one steel plate, and equipment investment cost can be reduced.

Further, in a brush seal device 1 of third embodiments according to the present invention, engagement portions 12 of a split brush-seal piece 4 have a projection 12B in a circular shape at one of the split face 11 and a recess 12A in a circular shape at the other split face 11 which engages with a projection 12B of a mating split brush-seal piece 4.

According to the third embodiment of a brush seal device 1 of the present invention, since the projection and the recess of the engagement portions 12 are formed in a circular shape, two corresponding engagement portions 12 can be easily and firmly engaged by aligning to fit the engagement faces of the corresponding engagement portions 12. Also, it is easy to disengage the engagement portions 12 by the application of force in the direction of the engagement surface onto the projection 12B. Respective brush seals 2 are stacked one by one to easily assemble a device, According to the forth embodiment of a brush seal device 1 of the present invention, in one split face 11 of a split brush-seal piece 4 is provided a C-shape projection 12B, and in the other split face 11 is provided a circular recess 12A that can engage a projection 12B.

In a brush seal device 1 of the fourth embodiment of the present invention, since the projection 12B of the engagement portion 12 is formed in C-shape, elasticity toward the outer diameter can be effected, and the coupling force can be strengthened.

In a brush seal device 1 according to the claim 5 of the present invention, an annular brush seal 2 is formed by connecting through engagement portions 12 a plurality of split brush-seal pieces 4, each of the inner circumferences of which is generally formed in an arc shape.

According to the brush seal device 1 of the claim 5 in the present invention, an annular brush seal device 1 can be easily obtained by coupling the engagement portions 12 of split brush-seal pieces 4. Besides, since the split brush-seal pieces 4 can be cut out from a small plate even if the brush seal device 1 is larger, the yield of material is improved.

In addition, a number of split brush-seal pieces can be taken from one steel plate efficiently through etching process or the like, so that production cost can be reduced.

A brush seal device according to the preferred embodiments of the present invention has a configuration in which a brush seal unit is divided into a number of split brush-seal pieces with a projection and a recess on the both side, so that the coupling force between the split brush-seal pieces is great and easy work to assemble the brush seal device is achieved.

Also, since engagement portions of the split brush-seal pieces are coupled each other to form a brush seal device even if the brush seal device is large in size, a number of small split brush-seal pieces can be cut out from one thin sheet plate, and the yield of material is improved.

Since small split brush-seal pieces are coupled through engagement portions to form a large brush seal device, a split brush-seal unit of thin plate can be easily obtained by chemical fine processing and the performance of the brush seal device is improved as well as machinery equipment cost is reduced.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A brush seal device mounted on one of two components that are relatively rotated, for sealing the clearance given between the two components, comprising:

a brush seal having brush seal units made of thin plate, each brush seal unit having a brush section with slits on a side of the thin plate that faces the other component and having a base section on the opposing side that is fixed on the one component;

a backing plate for supporting an attachment section of the brush seal;

a support section for supporting the attachment section between the backing plate and the support section;

wherein the brush seal unit of the brush seal has a plurality of split brush-seal pieces, and each of the split brush-seal pieces has on its two split surfaces engagement portions, one having a projection and the other having a recess, which are capable of engaging a corresponding recess and projection of mating split brush-seal pieces, respectively.

2. The brush seal device according to claim 1, wherein the engagement portion of the split brush-seal has an arrow shaped projection one of the split faces and an arrow shaped recess on the other split faces to engage the projection of a mating split brush-seal piece.

3. The brush seal device according to claim 1, wherein the engagement portion of the split brush-seal piece has a projection in a circular shape on one of the split faces and a recess in a circular shape on the other split face to engage the projection of a mating split brush-seal piece.

4. The brush seal device according to claim 1, wherein the engagement portion of the split brush-seal piece has a C-shape projection on one of the split faces and a recess in a circular shape on the other split face to engage the projection of a mating brush-seal piece.

5. The brush seal device according to claim 1, wherein the annular brush seal is formed by connecting through engagement portions a plurality of split brush-seal pieces, each of the inner circumferences of which is generally formed in an arc shape.

6. The brush seal device according to claim 1, wherein the plurality of split brush-seal pieces are formed from a thin plate having a thickness of 0.5 to 0.03 mm.

7. The brush seal device according to claim 3, wherein the projection includes a slit and the recess further comprises at least one notch extending therefrom.

8. The brush seal device according to claim 7, wherein the at least one notch is circular in shape.

9. The brush seal device according to claim 1, wherein the engagement portion of the split brush-seal piece has a hexagon shaped projection on one of the split faces and a hexagon shaped recess on the other split face to engage the projection of a mating split brush-seal piece.

10. The brush seal device according to claim 4, wherein the C-shaped projection includes a slit at a root of the projection.

11. The brush seal device according to claim 4, wherein the C-shaped projection includes a slit at a tip of the projection.

12. The brush seal device according to claim 1, wherein the engagement portion of the split brush-seal piece has a projection in an S-shape on one of the split faces and a recess in a circular shape on the other split face to engage the projection of a mating split brush-seal piece.

13. The brush seal device according to claim 1, wherein the engagement portion of the split brush-seal piece has a projection in an L-shape on one of the split faces and a recess in an L-shape on the other split face to engage the projection of a mating split brush-seal piece.

* * * * *